(No Model.) 2 Sheets—Sheet 1.
C. W. BAIRD.
HAY RAKE AND LOADER.
No. 535,750. Patented Mar. 12, 1895.
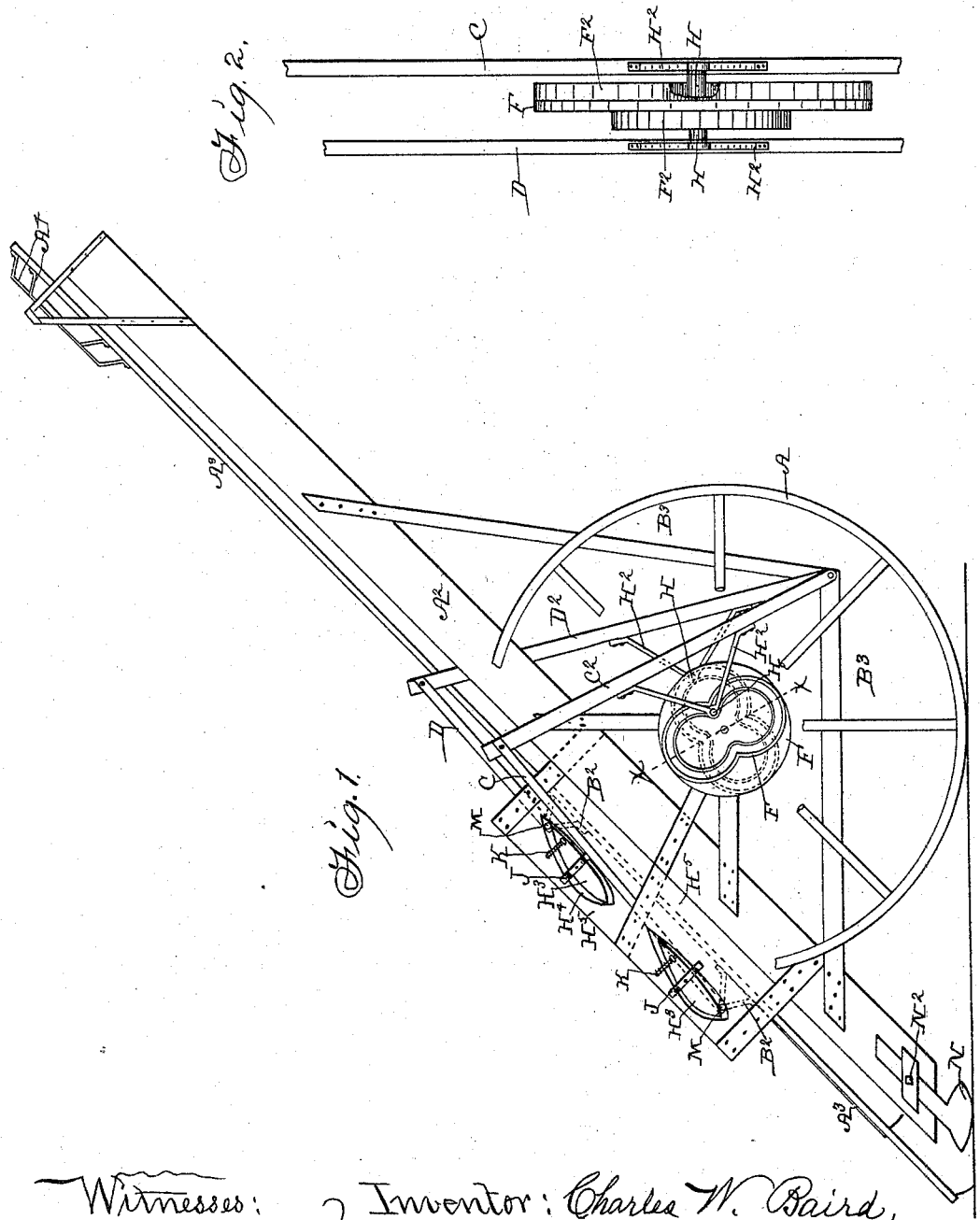
Witnesses:
R. H. Orwig
C. F. Wilcox
Inventor: Charles W. Baird,
By Thomas G. and J. Ralph Orwig, Attys.

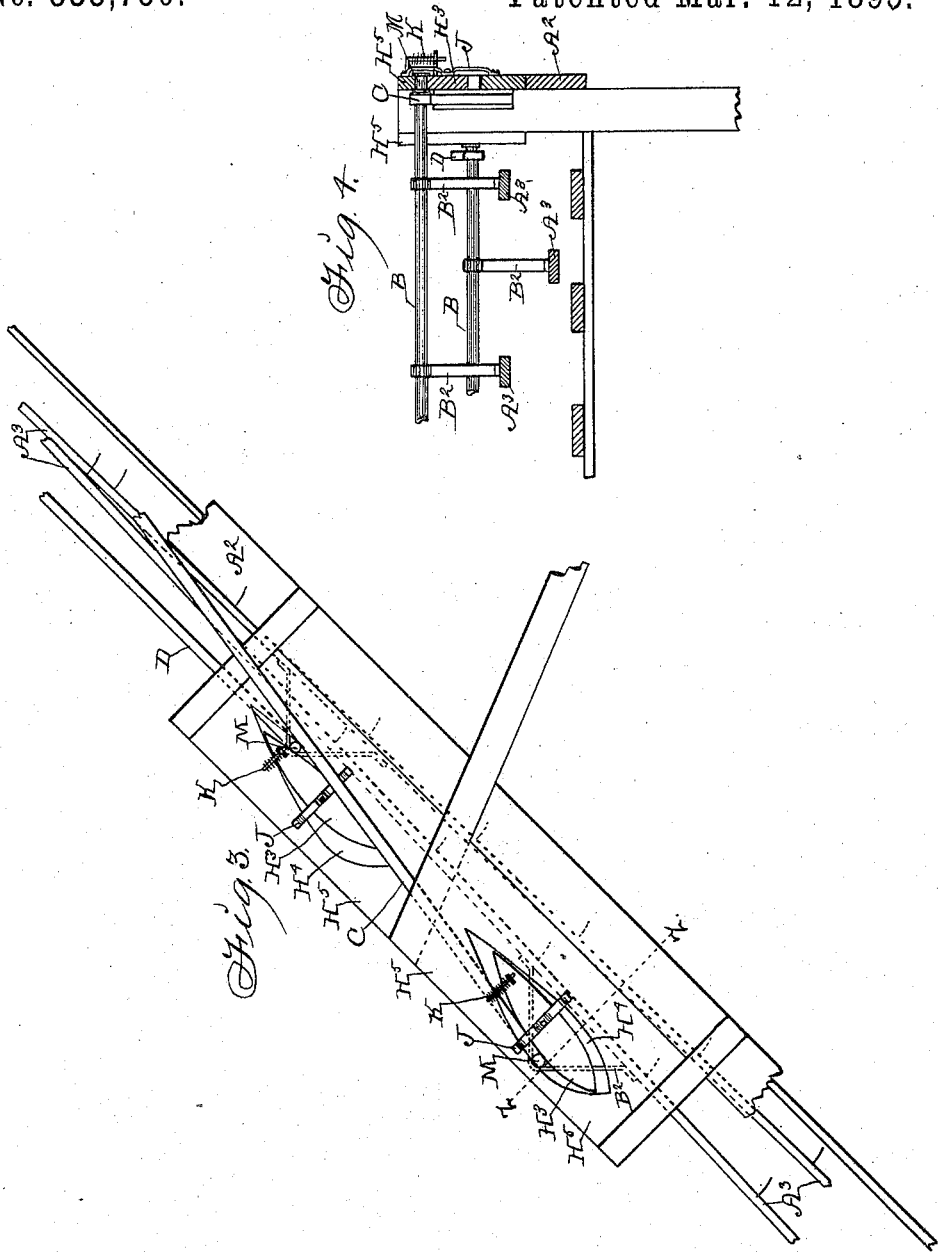

UNITED STATES PATENT OFFICE.

CHARLES W. BAIRD, OF MILLERSBURG, IOWA.

HAY RAKE AND LOADER.

SPECIFICATION forming part of Letters Patent No. 535,750, dated March 12, 1895.

Application filed November 23, 1893. Serial No. 491,804. (No model.)

*To all whom it may concern:*

Be it known that I, CHARLES W. BAIRD, a citizen of the United States of America, residing at Millersburg, Iowa county, and State of Iowa, have invented certain new and useful Improvements in Hay Rakes and Loaders, of which the following is a specification.

My invention relates to a patent, No. 508,397, dated November 14, 1893, for a hay rake and loader, issued to myself.

My objects are first to obviate the possibility of the rollers that travel around the elliptical cams being returned after a rearward stroke above, instead of below, the elliptical block by reason of shocks and jars to the machine frame when said rollers are at the rear end of the block, and further to arrange and combine therewith simple, cheap, and durable mechanism whereby the elevator bars may be reciprocated at double the speed of the traction wheels.

My invention consists first in the construction of the elliptical blocks and the opening in which they operate and further in the construction, arrangement and combination of the mechanism for imparting motion to the elevator bars, as hereinafter set forth, pointed out in my claims and illustrated in the accompanying drawings, in which—

Figure 1 is side elevation of the complete hay rake and loader, with parts of the traction wheels broken away. Fig. 2 is an enlarged detail sectional view through the line $x-x$ of Fig. 1. Fig. 3 is an enlarged side view of the mechanism for imparting an approximately elliptical motion to the lower ends of the elevator bars, and Fig. 4 is a sectional view taken through the line $z-z$ of Fig. 3.

Referring to the accompanying drawings, the reference letter A is used to designate the traction wheels of the device. $A^2$ is the elevator or loader frame, mounted upon the axles of said wheels.

$A^3$ designates elevator bars located above the frame $A^2$ and arranged to slide longitudinally thereon by having the guides $A^4$ secured thereto and overlapping a cross piece of the frame.

Cross pieces B, B, are secured to each alternate elevator bar by the brackets $B^2$ so that a reciprocating movement, in opposite directions, applied to the said cross bars will reciprocate the alternate elevator bars in opposite directions. C designates an arm attached to one of the said cross pieces and D a like arm attached to the other.

$C^2$ is a lever pivoted to the end of the rod C and having its lower end pivotally attached to a brace $B^3$, that is fixed to the elevator frame. These levers have motion imparted to them by means of the following devices.

F designates a circular plate fixed to the rotatable axle of the traction wheels and $F^2$ is a groove formed on the outer face of said plate and composed of two circular grooves formed in said plate in the same longitudinal plane and each large enough, if continuous, to extend from the circumference a slight distance beyond the center of the plate. They are however made continuous from the points of intersection, as clearly shown in the drawings. A like groove is formed in the opposite side of the plate with the grooves extended in a plane at right angles to the outer ones. H designates rollers adapted to enter the said grooves and fixed to said levers, by means of the braces $H^2$.

It will be obvious that as the traction wheels are rotated, a reciprocating motion will be imparted to the arms C and D, each of which will make two complete strokes, that is, backwardly and forwardly, each time the traction wheels make a complete revolution.

The devices for controlling or guiding the motions of the elevator bars comprise the block $H^3$ pivotally mounted in the opening $H^4$ of the frames $H^5$. This block $H^3$ is approximately elliptical in shape, but pointed at each end, and its pivotal connection is made by means of a brace J connected with the top and bottom of the frames $H^3$ and provided with an inwardly projecting pivot on which the said block is mounted. A yielding pressure device K is arranged to exert a downward pressure on the forward end of the block and normally hold it against the lower edge of the opening in the frame, for purposes hereinafter set forth.

M designates flanged rollers on the ends of the cross pieces B to run between the elliptical block and the edges of the opening in the said frame. These rollers travel completely around the said elliptical block as follows: As the roller approaches the forward end of the block, it will elevate the same until it passes beyond its end. The block will then be forced downwardly by the yielding pressure device K and the roller be compelled to return above the block. As the roller approaches the rear end of the block it depresses the rear end, and after it has passed beyond it, the yielding pressure device will again throw it upwardly and compel the roller to pass beneath the block. By this arrangement of the elliptical block, the roller is compelled to pass in the proper direction from the ends of the block and will not be affected by shocks and jars to the machine frame. One of said blocks is located at each end of each of the cross bars B and in order that they may not interfere with each other the one cross bar is placed some distance in advance of the other, as clearly shown in the drawings.

Means are provided for adjusting the distance between the ends of the rake bars, when at the bottom of their stroke, and the ground surface, as follows: A runner N is adjustably secured to the lower end of each of the side pieces of the elevator frame by means of the set screw N². When it is desirable to elevate the frame the runner is lowered and vice versa.

The opposite sides of the entire machine are exact counterparts so that where but one has been described it is intended to be implied that the other is similar.

Having thus described my invention, what I claim as new therein, and desire to secure by Letters Patent of the United States therefor, is—

1. In a hay rake and loader having a suitable frame mounted on wheels and two independent, alternate sets of elevator bars slidingly mounted above the frame, the combination of two auxiliary frames at each side of the main frame, each having an elliptical opening therein pointed at each end, an elliptical block pointed at each end pivoted in each of said elliptical openings and adapted to engage the bottom edge of the opening at its forward end and the top edge at its rear end, yielding pressure devices for holding said blocks in position, a cross piece secured to each set of elevator bars and rollers on the ends of said cross pieces placed between the elliptical blocks and the edges of the elliptical openings, to operate as and for the purposes stated.

2. In a hay rake and loader the combination of the following elements, a suitable frame mounted on wheels, two independent, alternate sets of rake bars mounted thereon, a cross bar attached to each end, two auxiliary frames in each side of the machine frame having elliptical openings therein pointed at both ends, an elliptical block pointed at both ends, pivotally mounted in each opening, and adapted to engage the bottom edge of the opening with its front end and the top edge thereof with its rear end, yielding pressure devices adapted to normally hold said blocks in position as set forth, a disk fixed to the rotatable axle of the traction wheels, two cam shaped grooves formed on the opposite sides of said disk at right angles to each other as set forth, two levers pivoted to suitable parts of the machine frame, an anti-friction roller on each adapted to enter the grooves in said plate, rods pivoted to the tops of said levers and to the cross pieces that are secured to the elevator bars, all arranged and combined substantially as and for the purposes stated.

CHARLES W. BAIRD.

Witnesses:
J. L. MILLER,
G. M. CLEVENGER.